Patented Feb. 25, 1930

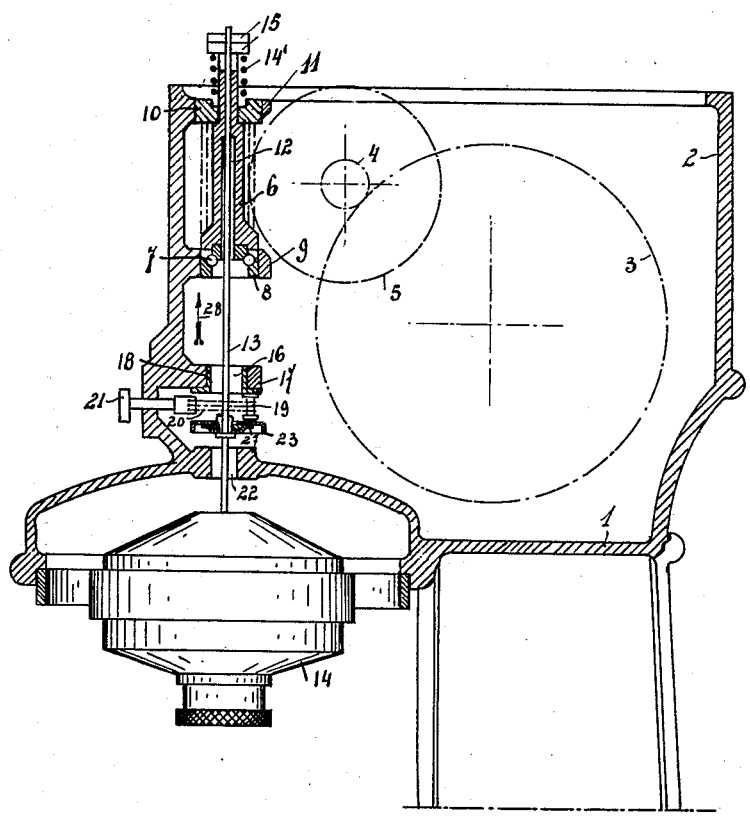

1,748,391

UNITED STATES PATENT OFFICE

JULES PERSOONS AND ALPHONSE PERSOONS, OF THILDONCK, BRABANT, BELGIUM

CREAM SEPARATOR

Application filed February 23, 1929, Serial No. 342,103, and in Belgium March 2, 1928.

This invention relates to cream separators provided with a freely suspended drum of that type in which the driving of the suspension rod is produced by a hollow shaft.

As is well known, in cream separators of this type, the suspension rod of the drum generally cooperates with a guide the function of which is to limit the oscillations of the rod. In order to make this guide as efficient as possible, it is desirable to have the guide exert its action on a rod of considerable length and at a point on the rod as near as possible to the drum. This condition, however, is not met in the known constructions, since, in order to facilitate dismounting of the driving members and to insure proper lubrication, the guide is generally combined with the ball bearing supporting the lower end of the hollow shaft, which is provided with a worm or other driving members. Moreover, in those constructions, the whole assembly comprising the rod, the guide, the ball bearing and the hollow shaft must be removed from the driving gear box of the separator through the upper part of said box. Consequently, adjustment of the guide from the outside of the apparatus is impossible.

This invention has for its object to obviate these disadvantages and to provide a construction in which the hollow driving shaft for the suspension rod of the drum is considerably reduced in length as compared with prior devices of this kind, whereby it is possible also to reduce the diameter of its bore and at the same time to insure the proper amplitude of oscillation of the suspension rod. It has also for its object to render possible the use of a guide which can be adjusted from the outside of the apparatus and which does not interfere with the easy dismounting of the suspension rod.

With this object in view, the invention essentially consists in the special arrangements and combinations of parts hereinafter fully described and pointed out in the appended claims.

In the annexed drawing:

Fig. 1 shows diagrammatically in vertical section the upper part of the frame of a cream separator constructed according to the invention.

Fig. 2 is an enlarged view of a detail of the mechanism. The frame comprises, as usual, a box or casing 2 in which are mounted gearing 3, 4 and a worm wheel 5 for transmitting motion to a hollow shaft 6 by means of a worm formed on the periphery of said shaft. The shaft 6 rests at its lower end on a ball bearing 7, the race 8 of which is mounted directly in a bracket 9 which projects from the wall of the gear box 2, and at its upper end is journaled in a bushing 10 also mounted in a bracket 11 formed on the wall of the gear box 2. According to the invention, the hollow shaft is as short as possible and its diameter is accordingly reduced. It is provided with a central bore 12 through which passes a rod 13 from which the drum 14 is suspended. This rod 13 is rotated by the hollow shaft 6, in a known manner, for instance by means of a clutch comprising a spring $14^1$ encircling the upper end of the shaft and secured at one end to one of a pair of nuts 15 threaded on the end of the rod 13.

The rod 13 passes freely through an opening 16 formed in a bracket or projection 17 extending from the wall of the gear box, in which bearing is secured a sleeve 18. On this sleeve 18 at opposite sides of the rod 13, spindles 19 are mounted on which pass the cables 20 of a guide which is adjustable from the outside by means of a screw 21. The bracket 17 and the sleeve 18 are independent from the ball race 8 and are placed at the greatest possible distance from said race, in order to act on a length of rod as great as possible. Moreover the casing 2 is provided, in its lower part, with an opening 22 through which passes the rod 13 and which is normally covered by an inverted cup 23.

The cup 23, instead of being permanently secured as heretofore on the rod 13, is in the present instance fixed on said rod by friction. To this end, the rod 13 is provided with a member 24 of ogee form exteriorly and having a flange at its lower end, the portion immediately above the flange forming an annular groove for the reception of a rubber packing ring 25 secured in a groove 26 formed between the body of the cup 23 and a washer 27 riveted on said cup, whereby the cup is frictionally secured to the rod 13. After the ball race 8, the hollow shaft 6 and the guide 20 have been assembled in their working positions within the casing, the upper end of the rod 13 is introduced into the opening 22 in the bottom of the gear casing, and by pressing the rod upwardly in the direction of the arrow it passes first through the central opening of the packing ring 25, then through the opening in the plate of the guide member, and, after having been passed through the hollow shaft 6, it is connected with the latter outside of the gear box by means of the spring 14 and nuts 15. In the meantime, the upward pressure on the rod has caused the upper enlarged portion of the member 24 to pass through the opening in the packing ring 25, so that the latter now enters the annular groove in said member and thus secures the cup 23 on the rod. When the mechanism is to be disassembled, it is necessary only to remove the drum 14 and the nuts 15 and then exert a downward pressure on the rod 13. The cup 23 being then seated on the bottom wall of the gear box around the opening 22, by exerting a downward thrust on the rod 13 the enlarged upper portion of the member 24 can readily be caused to pass through the opening in the packing ring, thus releasing the cup 23 from the rod and permitting the latter to be removed through the opening 22 in the bottom of the gear case.

It will be observed, that in this construction, as the rod 13 cannot be removed through the upper part of the casing or box 2 together with the cup 23, the guide 20 does not interfere with the removal of the rod and that it is not necessary as heretofore to remove simultaneously from the driving box, the hollow shaft and its ball bearing. Those members may consequently have dimensions which are considerably reduced. Moreover, as the hollow shaft and its ball bearing 8 are at a distance from the guide the length of the rod 13 on which the said guide acts is greater than in the usual constructions, so that a better guiding of the rod is obtained together with great facility of dismounting and simplicity in construction.

We claim:

1. A driving device for cream separators, comprising a gear box, motion-transmitting means mounted for rotation in said box and including a vertically disposed tubular shaft, a rod extending at its upper portion through said shaft and at its lower end through an opening in the bottom of the gear box, releasable means for frictionally coupling said rod to said shaft for rotation therewith, means frictionally engaging said rod immediately above said opening and adapted normally to close the opening, the organization being such that upon release of said coupling means the entire rod may be pressed downward and removed through said opening.

2. A driving device for cream separators, comprising a gear box, motion-transmitting means mounted for rotation in said box and including a vertically disposed tubular shaft, a rod extending at its upper portion through said shaft and at its lower end through an opening in the bottom of the gear box, a member carried by said rod immediately above said opening and having an exterior annular groove, a member frictionally engaging said annular groove and adapted normally to close the opening, and releasable means for frictionally coupling said rod to said shaft for rotation therewith, the organization being such that upon release of said coupling means, downward pressure on the rod will cause said frictional member to disengage said groove and thereby permit removal of the entire rod through the opening in the bottom of the gear box.

3. A driving device for cream separators, comprising a gear box, motion-transmitting means mounted for rotation in said box and including a vertically disposed tubular shaft, a rod extending at its upper portion through said shaft and at its lower end through an opening in the bottom of the gear box, releasable means for frictionally coupling said rod to said shaft for rotation therewith, a member carried by said rod immediately above said opening and having an exterior annular groove, a member of inverted cup shape encircling said groove and adapted normally to close the opening, and elastic means between said member and groove for frictionally coupling the cup shaped member to said rod.

4. A driving device for cream separators, comprising a gear box, a vertically disposed tubular shaft mounted at its upper and lower ends in bearings carried by said gear box, a rod extending at its upper portion through said shaft and at its lower end through an opening in the bottom of the gear box, releasable means for frictionally coupling said rod to said shaft for rotation therewith, means frictionally engaging said rod immediately above said opening at a point axially remote from the lower bearing of said tubular shaft, said means being adapted normally to close said opening, and a guide disposed between said closing means and said lower bearing of the tubular shaft.

5. A driving device for cream separators, comprising a gear box, a vertically disposed tubular shaft mounted at its upper and lower ends in bearings carried by said gear box, a rod extending at its upper portion through said shaft and at its lower end through an opening in the bottom of the gear box, releasable means for frictionally coupling said rod to said shaft for rotation therewith, means frictionally engaging said rod immediately above said opening at a point axially remote from the lower bearing of said tubular shaft, said means being adapted normally to close said opening, a guide disposed between said closing means and said lower bearing, and means for adjusting said guide outside of the gear box.

In testimony whereof we have affixed our signatures.

JULES PERSOONS.
ALPHONSE PERSOONS.